United States Patent [19]

Raser

[11] Patent Number: 5,317,955

[45] Date of Patent: Jun. 7, 1994

[54] BELLOWS WITH ANNULAR VOLUME FILLERS

[76] Inventor: William H. Raser, 6451 W. 83rd St., Los Angeles, Calif. 90045

[21] Appl. No.: 786,889

[22] Filed: Nov. 1, 1991

Related U.S. Application Data

[63] Continuation-in-part of Ser. No. 565,950, Aug. 10, 1990, abandoned.

[51] Int. Cl.$^5$ .............................................. F01B 19/00
[52] U.S. Cl. .................................... 92/42; 92/34
[58] Field of Search ............... 92/34, 35, 37, 42, 41, 92/45, 46, 47

[56] References Cited

U.S. PATENT DOCUMENTS

| | | | |
|---|---|---|---|
| 903,465 | 11/1908 | Fulton | 92/34 |
| 1,178,638 | 4/1916 | Guest | 92/42 |
| 1,345,971 | 7/1920 | Star | 92/42 |
| 1,422,802 | 7/1922 | Whittingham | 92/34 |
| 1,971,928 | 8/1934 | Zallea | 92/42 |
| 2,056,106 | 9/1936 | Kuhn | 92/42 |
| 2,085,563 | 6/1937 | Aime | 92/34 |
| 2,323,985 | 3/1941 | Fausek et al. | |
| 2,893,431 | 7/1959 | Bowditch | 92/42 |
| 3,135,295 | 11/1961 | Ziebold | |
| 3,401,607 | 9/1968 | Wortman | 92/42 |
| 3,469,502 | 2/1967 | Gardner | |
| 3,530,770 | 9/1970 | McMurray | 92/42 |
| 4,381,648 | 5/1983 | Balas | |
| 4,490,974 | 1/1985 | Colgate | |
| 4,703,622 | 11/1987 | Raser | |

FOREIGN PATENT DOCUMENTS

| | | | |
|---|---|---|---|
| 0114062 | 7/1982 | Japan | 92/42 |
| 899322 | 6/1962 | United Kingdom | 92/34 |

OTHER PUBLICATIONS

Becht, C. et al: Metallic Bellows and Expansion Joints: Part II, 1984, p. 24, FIG. 1 published by the American Society of Mechanical Engineers, 345 E 47th Street, N.Y., N.Y. 10017.

Graham, H. et al: Standards of the Expansion Joint Manufacturers Association, 1985, 25 N. Broadway, Tarrytown, N.Y. 10591, p. 98. Also, p. 91 of these standards shows typical reinforcing rings manufactured by Johnson Controls.

*Primary Examiner*—Thomas E. Denion
*Attorney, Agent, or Firm*—William H. Maxwell

[57] ABSTRACT

In a flexible bellows used to implement some change of volume, material is added inside of the convolution walls to reduce the clearance volume associated with the fully compressed mode. For gas compression applications, this combination of bellows walls and independently-added filling material not only improves the volume and compression ratios available but also provides an opportunity to design for lower stress and longer life.

8 Claims, 2 Drawing Sheets

BELLOWS WITH ANNULAR VOLUME FILLERS

This application is a continuation-in-part of Ser. No 07/565,950 filed Aug. 10, 1990 now abandoned.

BACKGROUND AND THEORY

This invention relates to refrigeration systems, heat engines and other thermodynamic apparatus which usually utilize a piston in a cylinder for compression of a gas. Sometimes, bellows are used in place of pistons because they avoid the life-limiting wear between piston and cylinder, they eliminate the contamination of any oil required for piston lubrication and they operate without the usual type of friction and leakage. It could be argued that only bellows seals offer an opportunity of achieving theoretically infinite life in such apparatus. But bellows have disadvantages.

In terms of disadvantages, there are two types of bellows, the formed bellows and the welded bellows. This invention applies to the formed type. Formed type metal bellows are usually made from either a welded or a seamless thin-walled tube, preferably the latter. Neglecting electroforming, the forming process usually involves a combination of rolling, squeezing and the use of hydraulic pressure. Their convolutions are characterized by smooth sections such as those of torroids; such cross sections are often identified as "U-shaped", "S-shaped", etc. See ASME Publication PVP-Vol. 83, page 24 which is hereby incorporated herein by reference. The main disadvantage found in formed types of bellows is their inability to be safely compressed to a mode shape characterized by small dead volume. Dead volume is the clearance volume which remains inside of a bellows when the bellows is fully compressed. Some applications require that the dead volume be less than one tenth of the total displacement volume. Most formed type bellows can not meet this requirement.

The second of the two major types of bellows is the welded bellows. This refers to various welded disk types wherein an extensive amount of welding is required in fabrication. It does not refer to a formed bellows made from a welded tube. The main disadvantage of welded bellows is a tendency toward high stresses and toward greater uncertainty when calculating such stresses. To reduce these disadvantages, various methods of obtaining tight control of the welding process have been tried. However, so far, the results have quite often been disappointing when compared to the reliability of welds in other types of structures. The reasons include the coincidence of the weld and the maximum stress location resulting from this geometry, problems with double welding, the sharp notch effect, an inability to clean and inspect welds from inside, the exposure to stress concentration over a large total length of welds, etc. For these reasons, welded bellows are not suited to meet very long life applications.

In this type application, what is needed is a bellows that can not only improve system efficiency by having less dead volume but also improve reliability by offering the designer a chance to lower stresses as if dead volume could be ignored. Page 98 of the EJMA Standards shows the reliability benefit from reduced stresses. To reduce both stresses and dead volume simultaneously, a variety of rather simple design changes have been tried with limited success. Examples are the shape shown in FIG. 6 of U.S. Pat. No. 3,469,502, reinforcing rings of U.S. Pat. Nos. 2,323,985 and 3,135,295, etc. What is needed now is an approach to the design of bellows that promises far larger reductions in stress and dead volume than these simple changes can provide.

OBJECT

A general object of this invention is to provide a bellows or a bellows like assembly which has the stress characteristics of a formed bellows and the overall dead volume characteristics of a welded bellows. A more specific object is to add volume-filling material effectively to an already fabricated preferably-formed bellows in a way that creates no stress increases when operated in a given application. Just filling a cylindrical void within the inside diameter of a formed bellows will not usually achieve dead volumes small enough for some applications; to be effective, the volume filling must be extended to include the space inside of the convolutions, i.e., the relatively inaccessible space between the inside and outside diameters of the bellows. In some cases, filling just a small fraction of this inaccessible space is good enough.

A further object of this invention is to provide an annular volume filler which can be installed conveniently in the somewhat inaccessible space inside of a bellows convolution but outside of the bellows inside diameter. During such an installation, there should preferably occur no scratching or unusual bellows flexing.

A further object is for each annular filler to have so little mass that there exists neither a tendency for the convolutions to resonate and increase maximum stress significantly due to dynamic stresses nor a tendency to rattle inside its convolution and cause significant impact stresses. One such filler could be a ring that would press lightly against a convolution wall by contacting this bellows wall at only the center of the crown, i.e., the outermost point of the filler cross section. Such a filler would be held in place mainly by friction forces along a narrow circumferential strip.

A further object is for each annular filler to be hermetically sealed and incapable of causing any outgassing.

SUMMARY OF THE INVENTION

This invention is the result of failures of several government and private attempts to demonstrate billion-cycle reliability of cryocoolers which use welded bellows as seals. Fabrication of volume fillers for formed bellows using solid metal stock proved to be impractical because of their complexity, cost, weight and installation difficulty. Instead, this invention relies on the use of concentric rings of soft meta most of which are tubes that have thin walls. Before the tubes are sealed, plastic foam is sometimes blown into the tubing to help the thin walls resist large pressure variations inside the bellows. The number of rings and their sizes depends on the dimensions of the bellows selected.

For any given application in which there is no limit placed on the size of the bellows selected, a formed bellows with no stress concentrations at its surfaces can always be found to resist the given loading conditions without exceeding a specified maximum stress If the bellows is formed from stainless steel with known fatigue characteristics, the bellows can be designed to survive a given life requirement. In other words, the first step is to find a suitable formed bellows without regard to the dead volume limit.

The volume filler added inside of each convolution to satisfy the most severe dead volume requirements can consist of the following three types of rings: tension rings, compression rings and free rings. These resist circumferential tension, circumferential compression, and neither, respectively. Their cross sections are usually mostly hollow circles, solid rectangles and hollow rectangles, respectively. A typical volume filler consists of one tension ring on the outside, one compression ring inside and one or more free rings in between Actually, the compression and free rings are more accurately described as arcs of circles than as complete rings. The circumferential lengths of the tension and compression rings are matched functions of the convolution outside and inside diameters. The relationship is such that when the compression ring is squeezed inside of the other rings, its compressive hoop stresses cause it to press outward and to transmit radial forces through the free rings to the tension ring. The tension ring resists most of these radial forces by resisting circumferential tension. Ideally, there is just enough circumferential tension to cause a pressing of the tension ring against the inside of the crown of the convolution wall and just enough friction to hold all rings in place.

Fortunately, however, the balance of forces described above is not essential. Because it lies in a different direction, the main stress resulting from excessive pressure of the tension ring onto the convolution wall tends to contribute only a negligible amount to the maximum stress in a typical bellows. Likewise, insufficient pressure between the tension ring and the bellows wall is tolerable because any rattling of the volume filler which results is able to develop only an extremely small amplitude of motion. At least, this is true if the filler has small mass and the two metals are dissimilar. Typically, the bellows is stainless steel and the filler is soft copper or aluminum except for the compression ring. The compression ring can be hard steel or phospher bronze.

Except for the compression ring which remains a flat band, the rings may be somewhat reshaped from their section shapes previously described. Mainly, the free rings can become rectangles or squares with slightly curved sides. The section shape of the tension ring may be reshaped into a slightly elliptical form. Such changes are useful in filling more volume inside the convolution. Some of the changes can be implemented with the rings in place simply by a forced compression of the bellows with external reinforcing rings in place. Although intended for a different purpose, one type of reinforcing ring which can sometimes provide this support is a type of clamped-on ring manufactured by Johnson Controls, Braunfels, Tex.

DESCRIPTION OF THE PREFERRED EMBODIMENT

Figure 1:
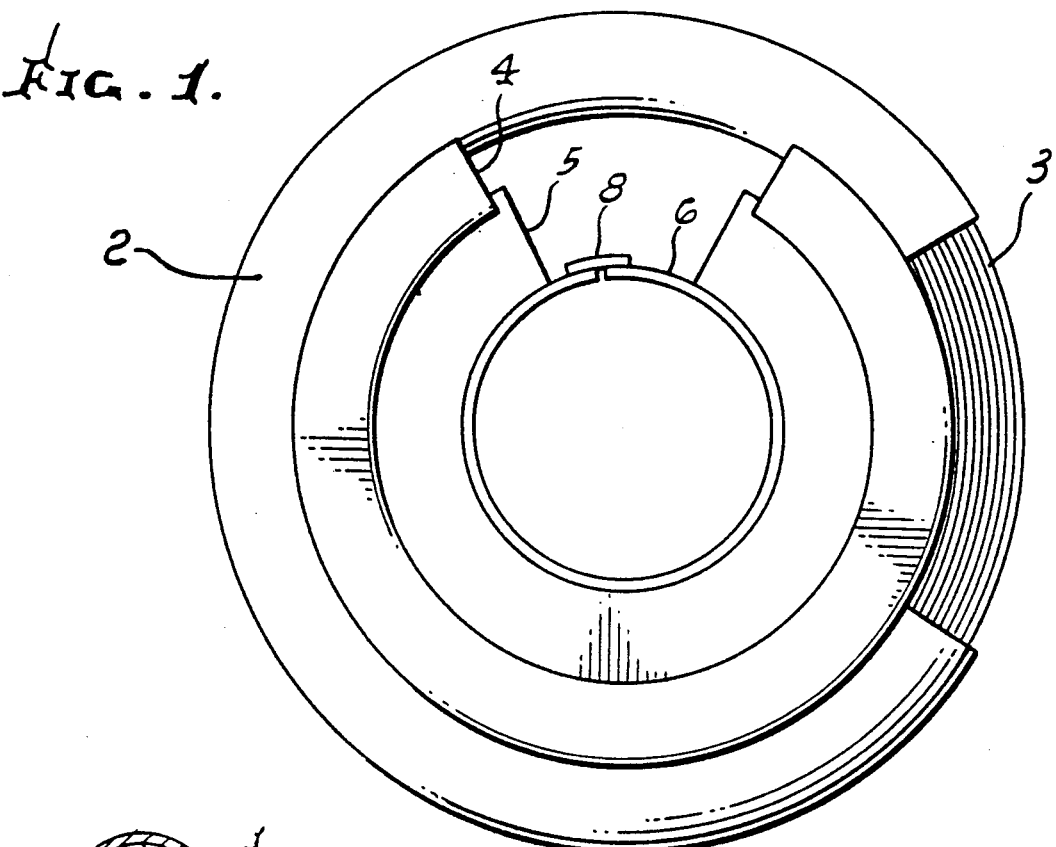
FIG. 1 is an axial-direction view of the preferred embodiment of an annular volume filler which could be assembled inside of one convolution of a bellows with its convolution depth exaggerated and showing the section of flexible wires 3.

This invention was summarized as being a bellows 1 containing annular volume fillers which consist of a tension ring 2, one or more free rings 4,5 and a compression ring 6. But because of some characteristics needed to facilitate installation, it is more convenient to think of the annular volume filler as being a ring which can be called a ringlet and to refer to its three components as being a ringlike tension-resisting tube 2, one or more arcuate tubes 4,5 and a band 6, respectively. Mostly, these characteristics provide for temporary coiling of the components so that their outside diameters are small enough to permit their installation in the bellows past the inside diameter of other convolutions than the one where a particular ringlet is being assembled. The assembled ringlet also provides space for a reasonable amount of compression and expansion of the bellows: the dotted lines in FIG. 2 represent the limiting modes of such deflections.

Figure 3:
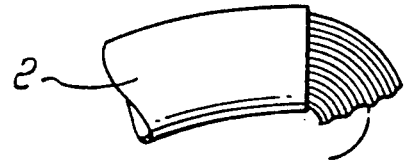
FIG. 3 is an axial fragmentary view of a ringlike tube which serves as the tension resisting ring of an annular volume filler with the ringlike tube shown in its coiled mode.

For the ringlike tube 2, which is originally an arcuate tube with a circular cross section, the coiling characteristic is provided by a flexible cable of fine wires 3 brazed into the tube ends to complete the ringlike shape. FIG. 3 shows how this cable can be bent to permit the ringlike tube 2 to pass through smaller circles than if the tube were a rigid ring.

Figure 2:
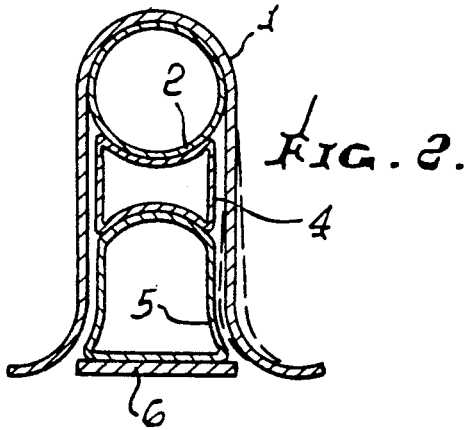
FIG. 2 is an enlarged fragmentary cross section of both the volume filler of FIG. 1 and the surrounding bellows convolution and showing the absence of flexible wires.
Figure 4:
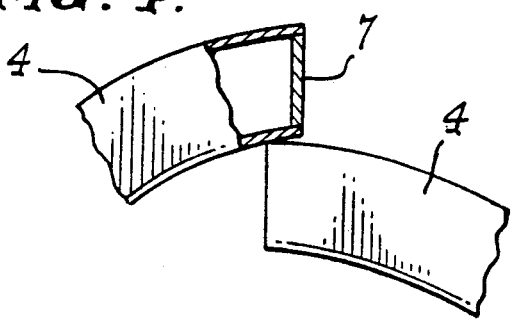
FIG. 4 is an axial fragmentary view of an arcuate tube which serves as a free ring of an annular volume filler with the arcuate tube shown in its coiled mode.

In FIG. 2, the ratio of convolution height to convolution wall-to-wall width is 2.7. This is below an optimum ratio based on minimizing bellows strain energy but it happens to enable the use of two initially-square arcuate tubes 4,5 which have side lengths just equal to the diameter of the cross section of the ringlike tube 2. To produce the preferred embodiment exactly as shown in FIG. 2, drawing dies are used to reshape the section of the outer tube 4 to one having tow straight sides and two sides with a curvature identical to that of the ringlike tube 2 and to reshape the section of the inner tub 5 into one having one straight side, one side with the same curvature as the ringlike tube and two sides with lesser curvature. This results in a geometry in which the cross section of the convolution void is more than 85% filled and a ratio of dead volume to displacement volume under on tenth. FIG. 2 also shows that the arcuate tubes 4,5 have sections with an axis of symmetry: having this simplifies the use of drawing dies. After reshaping, both ends of both tubes are sealed by brazing using end plates 7 and both tubes can accomodate some coiling as shown in FIG. 4. Although not shown, the two tubes can be brazed together in one or tow places only, the coiling being unaffected.

Thin-walled soft copper tubing with circular, square and rectangular sections can be obtained from Copper & brass Sales, 2131 S. Garfield, Los Angeles. By using such soft material in the tension ring 2 and the free rings 4,5, scratching and contact fretting of the bellows 1 is avoided if the bellows is of steel. However, before brazing such tubes to provide hermetic sealing, if large pressure variations are anticipated inside the bellows, rigid plastic foam using high temperature epoxy can be foamed inside the tubing to help the thin walls resist being crushed by external pressure.

Figure 5:
FIG. 5 is an axial fragmentary view of an arcuate band which serves as the compression ring of an annular volume filler with the arcuate band shown in its coiled mode.

Finally, a band 6 which is a strip slit from a steel sheet and which has exactly the right length to produce elastic compression is snapped into position inside of the inner tube 5. This step requires a small amount of coiling as shown in FIG. 5. As a result of a small aligning fence 8 brazed onto one end of the band and a small inclination given to the ends of the band, the band 6 is in stable equilibrium when forced into the final position shown in FIG. 1. In this position, it is in a state of elastic circumferential compression which generates a friction-producing pressure everywhere between it and the top of the bellows convolution 1. This friction holds together all of the elements of each ringlet.

DESCRIPTION OF THE ALTERNATE EMBODIMENT

Figure 6:
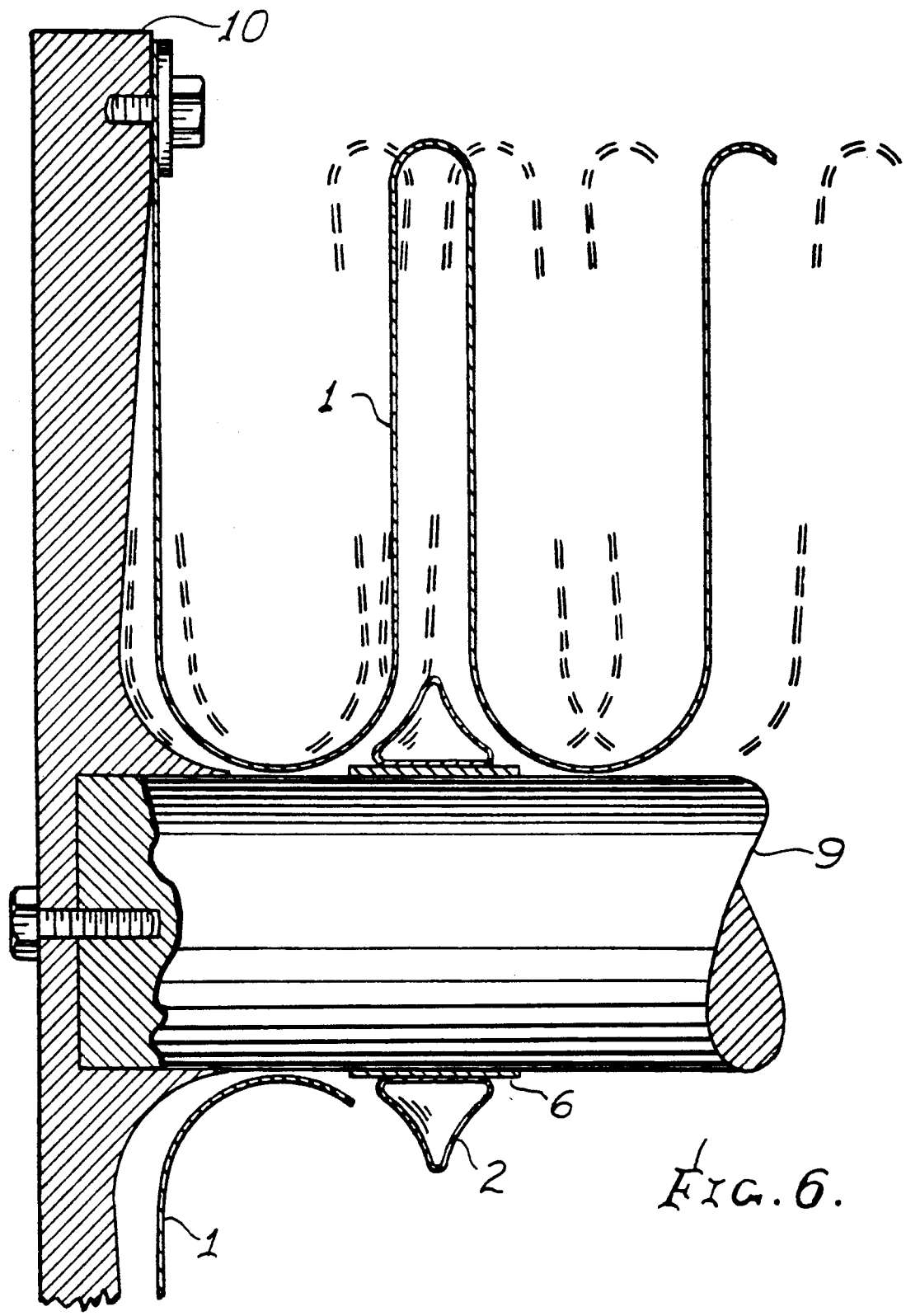
FIG. 6 resembles FIG. 2 but shows an alternate embodiment in which suitable dead volume reduction can be obtained without the use of any of the free rings.

Just as FIG. 2 represents the preferred embodiment, FIG. 6 represents this alternate embodiment. The alternate embodiment is simpler because the volume filler avoids the free rings 4,5 of the preferred embodiment but has two disadvantages. One disadvantage is the introduction of sliding movement between contacting surfaces The other disadvantage is that it fills dead space only in the vicinity of the inside radius of the bellows. Under certain circumstances, both of these disadvantages can be unimportant.

One of these circumstances is the use of a larger meridional radius at the root or inside diameter of each bellows convolution than is used at the crown or outside semitoroid. In FIG. 6, the convolutions of the bellows 1 are seen to have a ratio of root meridional radius to crown meridional radius of almost 3:1. A ratio much closer to infinity is obtained if the crown or outer semitoroid is replaced with a weld or braze joint between each pair of convolution sidewalls. In such cases, most of the dead volume to be filled is located in the vicinity of the inside radius of the bellows. Although circumferential welds are not desirable in a bellows, introducing them at all of the outside diameters is less harmful than doing so at all of the inside diameters where the stresses are greater.

Accordingly, this alternate volume filler has a smaller cross section and consists of just a tension ring 2 and a compression ring 6. As before, some coiling is necessary for installation so that a section of this ring 2 must consist of fine wires 3 as seen in FIG. 3. As before, the compression ring 6 with a fence 8 is as shown in FIG. 5. As before, the tension ring 2 can be made from an originally circular-sectioned tube; however, in this embodiment, minimizing dead volume requires that its cross section be reshaped to have two concave sides. As FIG. 6 shows, this section now has some resemblance to a triangle. The dotted lines represent the limiting modes of deflections of the bellows 1 and show why concave surfaces of ring 2 are desired to reduce dead volume. The successive positions at the end of the first convolution can be designated as C (compressed), U (undeflected) and E (elongated) as shown.

Both embodiments can avoid dead volume inside of the bellows inside diameter by using a cylindrical plug. In this alternate embodiment, this plug is a shaft 9 on which the compression band 6 of each annular filler fits and can slide in an axial direction. The rings are pushed by the convolution walls, the amplitude of motion of the first ring being approximately the distance shown between mode positions C and E in FIG. 6. The second ring will have twice as much sliding amplitude as the first and so on.

It was mentioned that introducing all this sliding action is not always a net disadvantage. In case of a long bellows subject to column-type buckling instability caused by large external axial load resisting internal pressure, the shaft 9 can serve as a stabilizing guide by being in contact with the root of each convolution. Such a shaft can be made of teflon to accomodate the sliding of both the convolution roots and the filler rings and can be grooved to accomodate axial fluid flow.

In other words, this alternate embodiment may be more suitable for very long bellows having different root and crown radii. A variety of ways of manufacturing bellows is know by those skilled in the art; this invention is not limited to exclude any of them. In general, the claims should not be considered limited to the two embodiments which I have described.

I claim:

1. A bellows with annular volume fillers comprising:
   a formed bellows with convolutions;
   a temporarily-coilable ringlike tension-resisting tube having a generally circular cross section and having an outside diameter which matches the outside diameter of the cavity inside one of the convolutions of said formed bellows;
   at least one arcuate closed-end tube having an originally rectangular cross section which has been reshaped for snugly adjoining positioning inside of said tension-resisting tub; and
   an arcuate compression-resisting band having a circumference such that when forced into place inside said at least one tube, the combination of said band and at least one tube clings together to form a ring which fills substantially the entire cavity inside said convolution of said bellows when the bellows is fully compressed, but which does not interfere with the compression or expansion of said bellows.

2. A bellows with annular volume fillers according to claim 1 in which a section of said ringlike tension-resisting tubing is a cable of thin flexible wires that is curved to provide coiling of the tubing to reduce its outside diameter and thereby permit said tube to be inserted in place through the inside diameter of the completely formed bellows, this coiling being a part of a fabrication process.

3. A bellows assembly according to claim 2 in which there are two arcuate originally-rectangular tubes, a first tube having a cross section containing two straight parallel sides and a second tube having ac ross section containing only one straight side, all other said originally rectangular sides being curved.

4. A bellows assembly according to claim 3 in which all said curved sides of the arcuate tube sections tend to minimize both the space between said tubes and the space within the convolutions of the bellows not filled by the volume fillers so that a total dead volume is small.

5. A bellows according to claim 1 in which at least said tension-resisting tube and said band are held together to form an annular volume filler which reduces a dead volume of the bellows.

6. A bellows according to claim 5 in which one said annular volume filler is placed inside of every said convolution.

7. A bellows according to claim 1 in which at least one said tube and said band are snapped into stable assemblies of volume fillers inside relatively inaccessible convolution voids to reduce dead volume without interfering with the tensile or compressive movements of the bellows walls.

8. An annular volume filler for a bellows comprising: a temporarily-coilable ringlike tensioning tube in the form of a cable of thin flexible wires to facilitate the positioning of said tub inside of a convolution of a bellows and having an originally circular cross section and having an outside diameter which matches the outside diameter of a cavity inside of a convolution of said bellow; and an arcuate compression-resisting band having an in-place circumference such that when forced into a central position inside of said tension-resisting tube, the combination of said compression-resisting band and said tension-resisting tube holds itself together to form a ring which fills substantially the entire cavity inside of a convolution of said bellows when the bellows is fully compressed but which does not interfere with the compression or expansion of said bellows.

* * * * *